United States Patent [19]
Hafeli

[11] 3,895,024
[45] July 15, 1975

[54] PROCESS FOR PREPARING 4,5-DIPHENYL-OXAZOL-2-ONE

[75] Inventor: Robert Hafeli, Zurich, Switzerland

[73] Assignee: Serna, A.G., Glarus, Switzerland

[22] Filed: June 24, 1974

[21] Appl. No.: 482,358

[30] Foreign Application Priority Data
Aug. 9, 1973   Switzerland.......................... 9985/73

[52] U.S. Cl............................................ 260/307 C
[51] Int. Cl............................................ C07d 85/38
[58] Field of Search ................................ 260/307 C

[56] References Cited
UNITED STATES PATENTS
2,857,394   10/1958   De Stevens.......................... 260/307

Primary Examiner—Donald G. Daus
Assistant Examiner—Raymond V. Rush
Attorney, Agent, or Firm—Ostrolenk, Faber, Gerb & Soffen

[57] ABSTRACT

A process for preparing 4,5-diphenyl-oxazol-2-one comprising reacting benzoin with cyanic acid. The product is useful as an intermediate in the preparation of anti-inflammatory agents.

6 Claims, No Drawings

PROCESS FOR PREPARING 4,5-DIPHENYL-OXAZOL-2-ONE

DETAILED DESCRIPTION OF THE INVENTION

This invention relates to a new process for preparing 4,5-diphenyl-oxazol-2-one of formula (I):

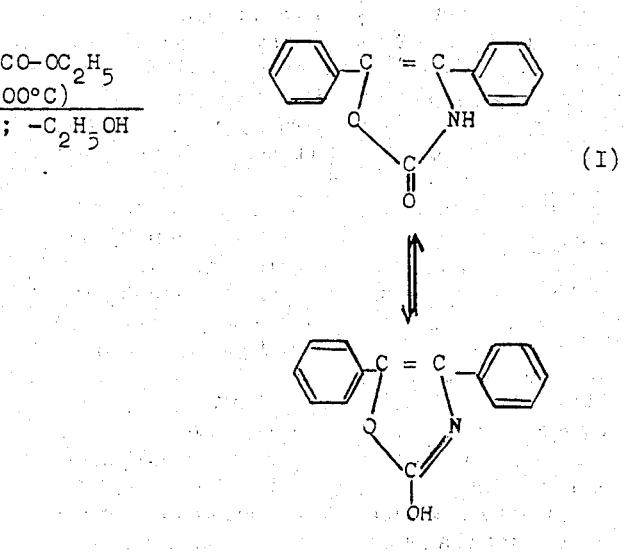

The above compound is useful as an intermediate in the synthesis of 4,5-diphenyl-oxazole derivatives having anti-inflammatory activity, e.g., 4,5-diphenyl-oxazoles with a substituted amino radical in the 2-position.

The usefulness of the compound obtained through the process of this invention rests chiefly in the fact that the 2-position of the oxazolone ring is easily chlorinated by the usual chlorinating agents, e.g., phosphorus oxychloride, in accordance with the following scheme:

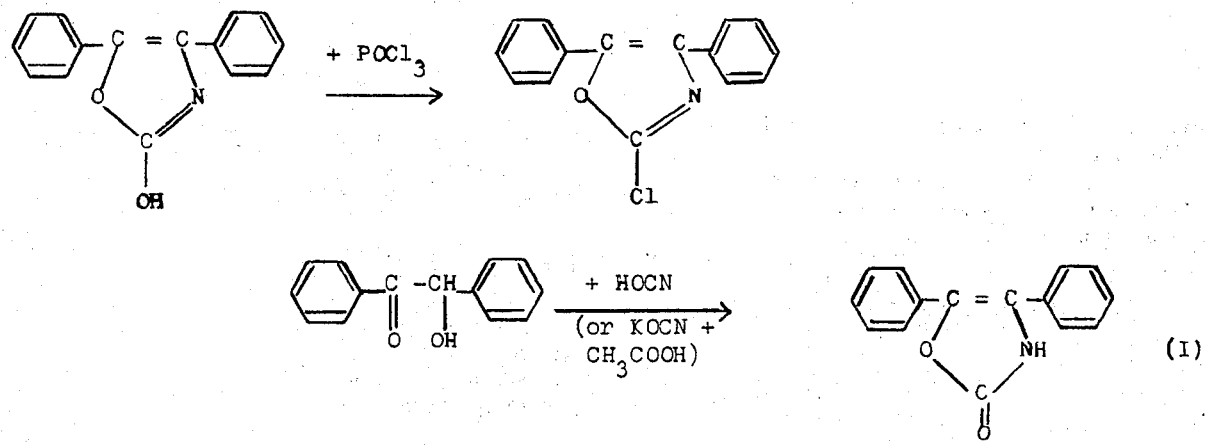

The resulting 2-chloro-4,5-diphenyl-oxazole, in turn, reacts easily with various organic compounds, particularly substituted amines, to give the above-mentioned products. See. U.S. Pat. No. 3,557,135.

The conventional method for preparing 4,5-diphenyl-oxazol-2-one consists in reacting benzoin with a carbamic acid derivative such as ethyl urethan or carbamoyl chloride. Alternatively, benzoin N,N-dimethyl-carbamate ester obtained by reacting benzoin with methyl carbamoyl chloride is cyclized with acetic anhydride [R. Gommper, Ber. 89, 1748-62(1956)].

The conventional method is further illustrated by the following reaction scheme:

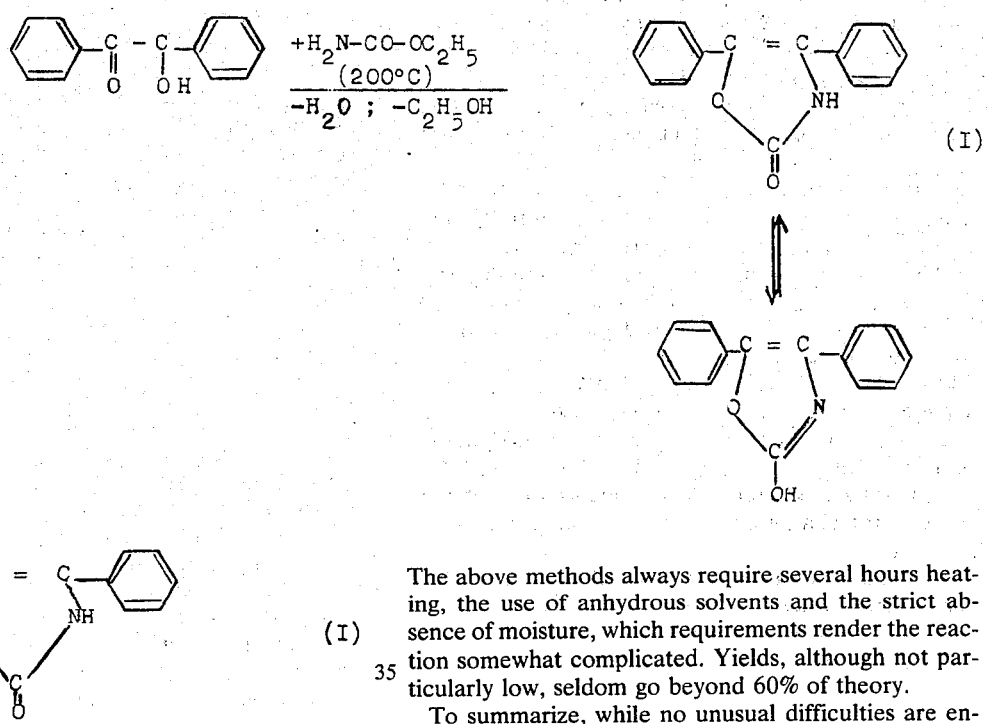

The above methods always require several hours heating, the use of anhydrous solvents and the strict absence of moisture, which requirements render the reaction somewhat complicated. Yields, although not particularly low, seldom go beyond 60% of theory.

To summarize, while no unusual difficulties are encountered in using the above-cited conventional methods, precautions normally employed in effecting organic reactions should be taken. In addition, the conventional methods appears to be lengthy.

I have now found, surprisingly, that 4,5-diphenyl-oxazol-2-one is very rapidly and simply obtained in a high yield by means of an original chemical reaction consisting in reacting benzoin with cyanic acid.

The process, according to the invention, is further illustrated by the following reaction scheme:

The practically instantaneous reaction is exothermic and initiates spontaneously.

The best yields are also obtained simply by bringing the reagents into contact with each other. Accordingly, the process of this invention does not require any of the precautions such as using anhydrous solvents and/or excluding moisture during the reaction and the like. In addition, heating is unnecessary because, as stated above, the reaction is exothermic and initiates spontaneously.

In practice, an alkali salt of cyanic acid is preferably used in place of free cyanic acid, e.g., KOCN. In this case, free cyanic acid is produced in the reaction vessel by means of addition of glacial acetic acid.

The reaction is preferably carried out in a solvent in which benzoin is soluble. However, the choice of solvent is not a critical aspect of the process according to this invention. In fact, the reaction proceeds with high yields even in a solvent in which benzoin is only slightly soluble or insoluble.

Solvents having a higher boiling point are preferably used because they permit the reaction mixture to reach higher temperatures and thus permit increased yields. When a solvent is used in which benzoin is either slightly soluble or insoluble, the reaction occurs mainly in the heterogeneous phase and leads to a comparatively less pure product.

A particularly preferred solvent is N,N-dimethylformamide. When the molar ratio of benzoin to cyanic acid was changed from 0.5:1 to 1:1, no substantial changes in the yield resulted. Therefore, it may be stated that the molar ratio of the reagents does not constitute a critical aspect of the process according to this invention.

The process of this invention is both new and chemically original because, according to the known addition reactions of cyanic acid, only the reaction illustrated in the scheme below should have been obtained (Ph = phenyl):

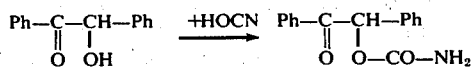

The addition of cyanic acid to keto-alcohols with ring closure, that is, the reaction:

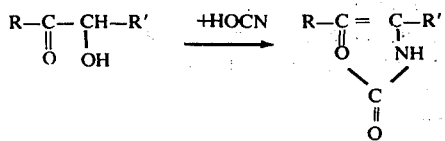

has not previously been described in the literature.

The process of this invention is also not obvious in view of other similar reaction mechanisms. The reaction having the closest similarity is that of acyloins with cyanamid, as below illustrated:

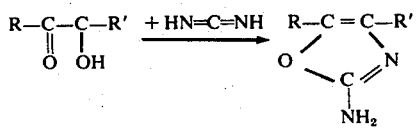

Using cyanamid in place of cyanic acid, the above reaction leads to 2-amino-oxazoles and not to oxazolones which are unsubstituted in the 2-position. In addition, the known process lends itself better to the synthesis of 4,5-dialkyl-oxazoles than to that of 4,5-diphenyl-oxazoles. The process is described in the following Nordmark-Werke's Patent Specifications: German 1,121,052; German 1,128,429, Addn. to 1,121,052; French M 2736.

From the above, the process according to this invention for preparing 4,5-diphenyl-oxazol-2-one appears to be neither anticipated nor suggested by the cited Nordmark-Werke's Patents. In addition, it should be pointed out that the reaction of alpha-bromo-acetophenone with sodium cyanamid to yield 2-amino-5-phenyl-oxazole had been disclosed in Liebig. Ann. Chem. 467, 262 (1928) prior to the dates of the Nordmark Patents.

In the following examples, preferred embodiments of the invention are described in greater detail for illustration purposes.

EXAMPLE 1

In a three-necked, 2-liter flask provided with mechanical stirrer and inner thermometer, 106 g (0.5 mol) benzoin were suspended in 200 ml N,N-dimethylformamide and heated to 70°–80°C under stirring.

To the resulting solution, 81 g (1 mol) potassium cyanate were first added and then 63 ml (1.1 mol) glacial acetic acid. The reaction being exothermic, the temperature of the mixture rose to about 120°C without external heating. After cooling to 50°C, 500 ml distilled water were added to the pasty mass in order to make the crystals filterable; the residue was washed on the filter and air dried to give a product with a melting point of 198° to 202°C (raw). Yield: 116 g or 98.5% of theory.

Recrystallization from methanol gave a product melting at 210° to 211°C.

EXAMPLE 2

The procedure described in Example 1 was repeated by reacting 106 g (0.5 mol) benzoin with 48.6 g (0.6 Mol) potassium cyanate and 37.7 ml (0.66 mol) glacial acetic acid to give the same yield (116 g) of final product.

What I claim is:

1. A process for preparing 4,5-diphenyl-oxazol-2-one comprising the step of reacting benzoin with cyanic acid.

2. A process according to claim 1 wherein cyanic acid is produced in the reaction mixture by reacting potassium cyanate with glacial acetic acid.

3. A process according to claim 2 wherein the reaction is carried out in a solvent for benzoin having a high boiling point.

4. A process according to claim 3 wherein the solvent is N,N-dimethylformamide.

5. A process according to claim 1 wherein the reaction is carried out in a solvent for benzoin having a high boiling point.

6. A process according to claim 5 wherein the solvent is N,N-dimethylformamide.

* * * * *